Feb. 21, 1933.  A. A. LETHERN  1,898,090
SAFETY HARNESS FOR AERONAUTS AND THE LIKE
Filed Sept. 8, 1931  4 Sheets-Sheet 1
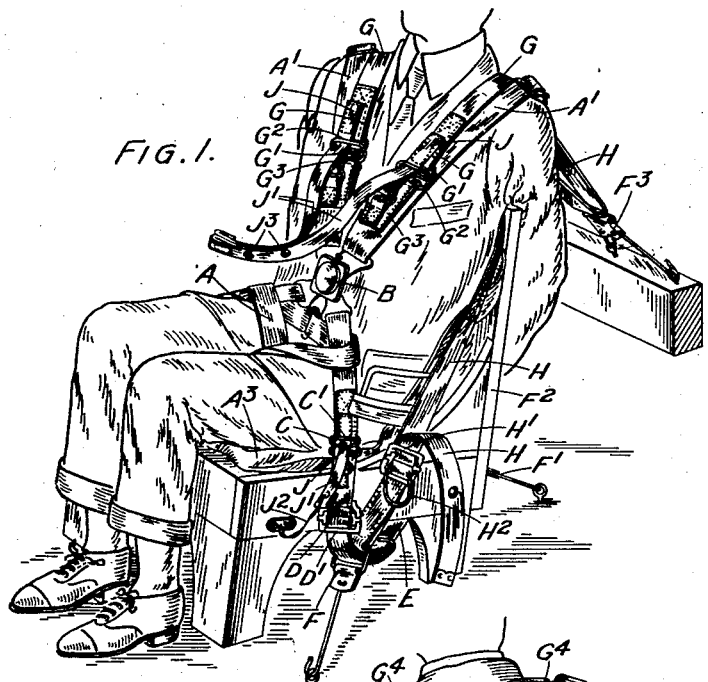
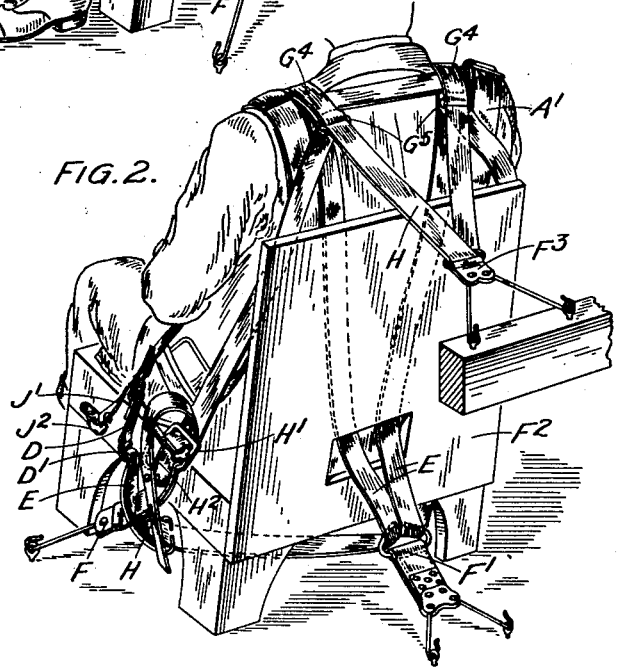
INVENTOR.
A.A. LETHERN
PER.
Attny Feb. 21, 1933.     A. A. LETHERN     1,898,090
SAFETY HARNESS FOR AERONAUTS AND THE LIKE
Filed Sept. 8, 1931     4 Sheets-Sheet 2
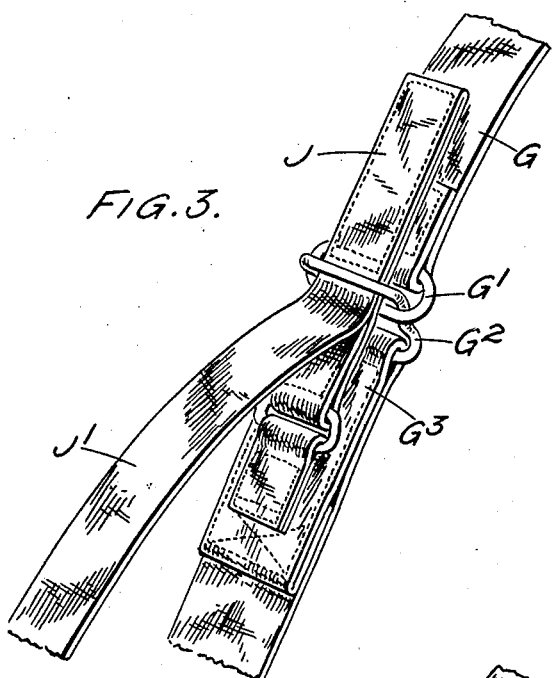
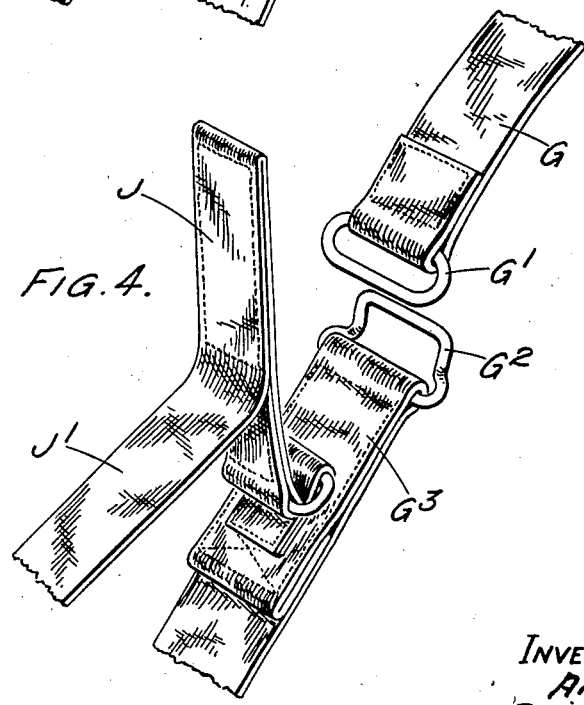
INVENTOR.
A.A. LETHERN
PER.

Feb. 21, 1933. A. A. LETHERN 1,898,090
SAFETY HARNESS FOR AERONAUTS AND THE LIKE
Filed Sept. 8, 1931 4 Sheets-Sheet 3
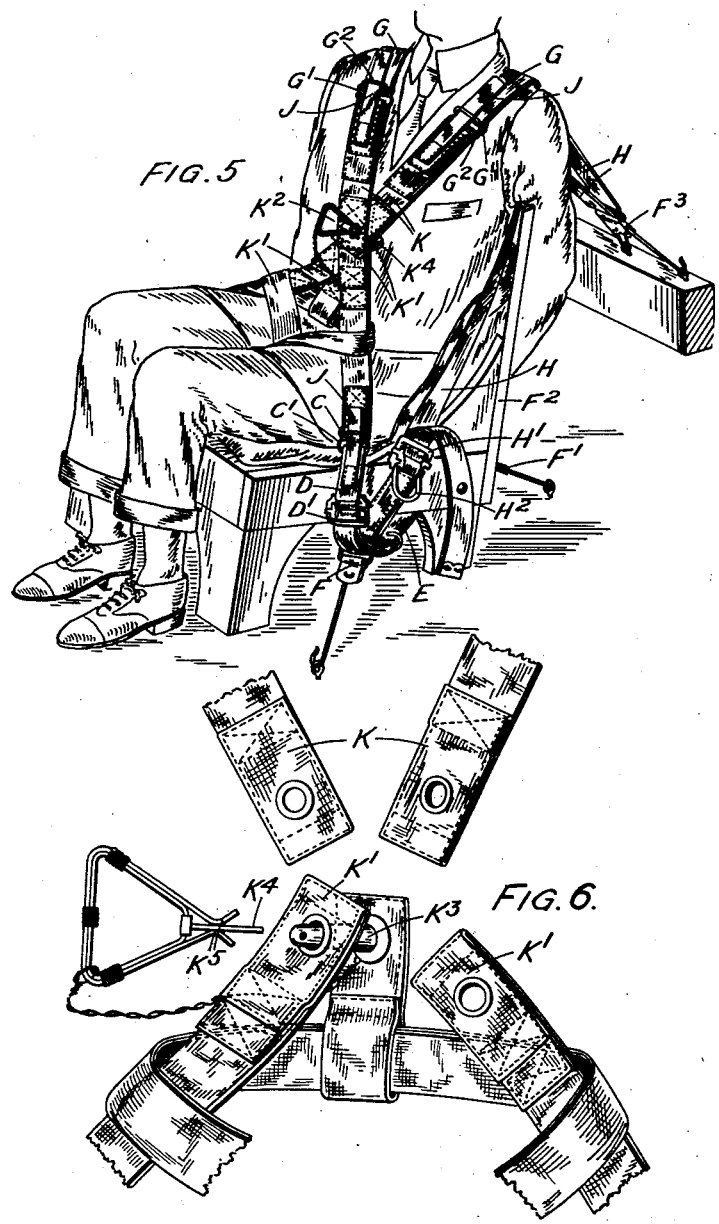
INVENTOR.
A.A. LETHERN
PER.
Attny.

Feb. 21, 1933.　　A. A. LETHERN　　1,898,090
SAFETY HARNESS FOR AERONAUTS AND THE LIKE
Filed Sept. 8, 1931　　4 Sheets-Sheet 4
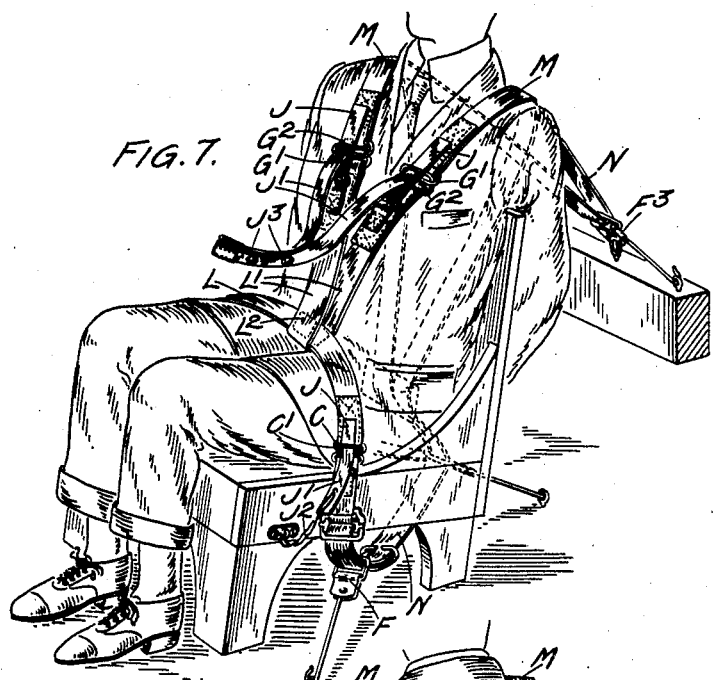
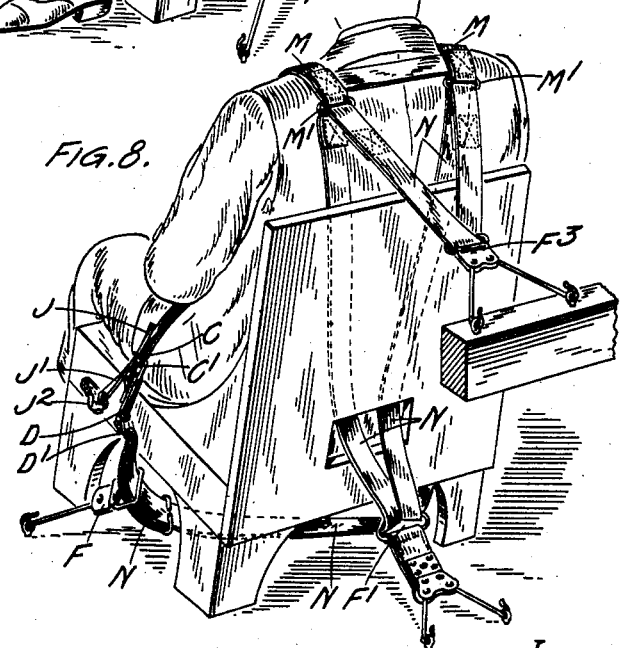
INVENTOR
A. R. LETHERN
PER.

Patented Feb. 21, 1933

1,898,090

UNITED STATES PATENT OFFICE

ALBERT ALEXANDER LETHERN, OF LONDON, ENGLAND, ASSIGNOR TO THE MILLS EQUIPMENT COMPANY LIMITED, OF LONDON, ENGLAND, A REGISTERED COMPANY OF GREAT BRITAIN

SAFETY HARNESS FOR AERONAUTS AND THE LIKE

Application filed September 8, 1931, Serial No. 561,801, and in Great Britain October 10, 1930.

This invention relates to safety harness for the use of aeronauts such as pilots of aeroplanes and the like, and has for its object to provide an improved form of safety harness capable of being used either alone or combined with suitable parachute harness which may comprise for example a parachute contained in a receptacle which forms a cushion on which the pilot sits, this cushion being connected to straps which pass up the wearer's back and over his shoulders to a central fastening device to which are secured the upper ends of straps which pass round the pilot's thighs.

Hitherto the safety straps used by air pilots have been provided with a single central fastening which had to be released before the pilot could leave his seat, such harness being additional to parachute harness where this was employed.

According to the present invention safety harness for air pilots or other aeronauts comprises shoulder straps adapted to pass from one or more anchors over the pilot's shoulders and to have their ends detachably secured to fastenings on each side of the pilot's breast, and thigh-anchoring straps adapted to be detachably connected to fastenings on the pilot's thighs. Where the safety harness is employed in conjunction with parachute harness, the ends of the shoulder straps are conveniently fastened to parts of the parachute harness lying on the pilot's breast by quick-release devices, while the thigh-anchoring straps are connected to the thigh straps of the parachute harness by fastenings which will be automatically released when the pilot rises after releasing the shoulder straps. Thus the release of the shoulder straps by means of the quick-release devices enables the pilot to free himself from the safety harness while still retaining the parachute harness intact.

On the other hand, where the safety harness is used without parachute harness a strap element or body harness may be employed comprising straps passing over or around the pilot's thighs and having two chest straps extending upwards from these thigh-retaining straps, the ends of the shoulder straps of the safety harness being connected respectively to the two chest straps by quick-release devices while the ends of the thigh-anchoring straps are connected to the thigh straps by devices which will be automatically released when the pilot rises after releasing the shoulder straps. It will thus be seen that the same safety harness can be employed either in conjunction with parachute harness, where such is worn by the pilot, or without such parachute harness, in which case a separate strapping element is provided to take the place of the part of the parachute harness to which the safety harness is connected when parachute harness is worn.

Alternatively the safety harness can be used without parachute harness by employing a strap element or body harness comprising straps passing over or around the pilot's thighs, these straps being equivalent, for example, to the thigh straps employed with parachute harness, and two separate chest straps, the lower ends of the chest straps and the ends of the thigh straps being connected together by a single central quick-release device. In this case the ends of the shoulder straps are connected to the upper ends of the chest straps by fastening devices which need not be of the quick-release type, while the thigh-anchoring straps are connected to the thigh straps by fastenings which also need not be of either the quick-release type or of a type which will automatically be released when the pilot rises, since in this arrangement the pilot can release himself from the harness simply by releasing the single central quick-release fastening connecting the ends of the thigh straps and the chest straps together.

In any case the harness preferably includes a strapping extending from each of two side anchors secured to the aircraft, through a loop on the adjacent shoulder strap and thence to a rear anchor which not only assists in anchoring the shoulder straps but also prevents the pilot pitching forward in his seat, and in this case quick-adjusting mechanism is preferably provided in this strapping adjacent to one or each of the side anchors so as to enable the pilot to loosen the strapping if he desires to lean forward, and then to tighten the strapping again when he resumes his normal position.

For example each thigh-anchoring strap may pass freely through its associated side-anchoring member and thence through an anchor disposed behind and below the pilot's seat, after which it passes upwards and either over the pilot's shoulder to constitute one of the shoulder straps or through a loop on a separate shoulder strap and thence to a further anchor situated behind the pilot so as to prevent the pilot pitching forward. In the former case where each thigh-anchoring strap, after passing through its associated side anchor and then through the lower rear anchor, passes upwards over the pilot's shoulder to constitute one of the shoulder straps, a separate strap preferably extends from one side anchor through a loop on the adjacent shoulder strap at the back of the pilot, thence through an upper rear anchor disposed behind the pilot's seat, through a loop on the other shoulder strap, and then to the other side anchor so as to prevent the pilot pitching forward, means being provided adjacent to one or each of the side anchors whereby the pilot can readily adjust the effective length of this strap so as to permit him to lean forward when desired.

As stated safety harness according to this invention may be employed either in conjunction with parachute harness or without such harness, and one arrangement of safety harness according to this invention as employed with parachute harness and two arrangements as employed without parachute harness are illustrated by way of example in the accompanying drawings, in which Figures 1 and 2 are perspective views respectively of the front and rear portions of one form of the harness as employed in conjunction with parachute harness, Figures 3 and 4 are enlarged views of the quick-release devices as employed in the construction shown in Figures 1 and 2, Figure 5 is a similar view to Figure 1 of one form of harness as it may be employed without parachute harness, Figure 6 is a detail view of the quick-release device employed in the construction shown in Figure 5, and Figures 7 and 8 are similar views to Figures 1 and 2 of an alternative form of harness according to this invention as employed without parachute harness.

In the construction shown in Figures 1 and 2, the safety harness is shown as applied to parachute harness of known type, as set forth in Patent 339,388 of Great Britain, filed September 24, 1929, comprising a thigh strap A which passes around the pilot's thighs and has its ends connected together and to two further straps $A^1$ by means of a central quick-release fastening device B, these straps $A^1$ passing upwards and over the pilot's shoulders and thence downwards to a parachute disposed in a bag forming a cushion $A^3$ on which the pilot sits.

Secured to the parts of the thigh strap A which extend down the outside of the pilot's thighs, are metal loops C which are adapted to be connected in a detachable manner, hereinafter described, to loops $C^1$ on the ends of thigh-anchoring straps D forming part of safety harness according to this invention. Each thigh-anchoring strap D is coupled through an adjusting buckle $D^1$ to a strap E which passes through a side anchor F secured to the floor of the cockpit or the like of the aircraft, and thence rearwards through a rear anchor $F^1$ also secured to the floor of the cockpit and common to both the straps E, from which these straps pass upwards through an aperture in the back of the pilot's seat $F^2$ and over his shoulders to constitute the shoulder straps G, these shoulder straps being connected behind the pilot's neck by a tie as shown. The ends of these shoulder straps carry metal loops $G^1$ which are adapted to be coupled by quick-release devices, hereinafter described, to metal loops $G^2$ on tabs $G^3$ carried by the straps $A^1$ of the parachute harness.

The shoulder straps G are provided with tabs $G^4$ carrying metal loops $G^5$ and a strap H passes through one of these loops, thence through a rear anchor $F^3$ and then through the other loop $G^5$, the ends of this strap H being connected through an adjusting buckle $H^1$ having a releasing loop $H^2$ to the side anchors F.

The metal loops $G^2$ are of somewhat hook-like form as shown in Figures 3 and 4 and are adapted to pass through the loops $G^1$ in the manner shown in Figure 3, the loops $G^1$ and $G^2$ normally being prevented from disengagement by a quick-release device comprising a flexible resilient strip J formed, for example, of fabric with spring steel within it, this strip being connected at one end to the strap $A^1$ of the parachute harness and being provided with a releasing tab or strap $J^1$ which when pulled flexes the strip J and withdraws it from the metal loop $G^2$ whereupon the two loops $G^1$ and $G^2$ disengage from one another so as to release the shoulder straps as shown in Figure 4. The loops C and $C^1$ are of similar form respectively to the loops $G^1$ and $G^2$ and are adapted to be connected by a resilient strip J having a releasing tab $J^1$ connected by a lanyard $J^2$ to the pilot's seat. As shown in Figure 1 the two releasing tabs $J^1$ of the quick-release devices J for the shoulder straps G are conveniently connected together by press fasteners $J^3$ or the like so that the two shoulder straps can be released simultaneously but should the loop formed by the two tabs $J^1$ foul the pilot's chin, for example when he is releasing himself from the parachute harness, the two tabs will break apart.

The operation of the harness is as follows.

Normally it will be seen that the pilot is anchored to his seat by the shoulder straps G and the thigh-anchoring straps D and also is held from pitching forward by the strap H. If the pilot wishes to release himself, however, he pulls the releasing tabs $J^1$ and thus releases the shoulder straps G. The pilot is then free to rise and as he rises the straps E will be free to pass through the side anchors F, until the lanyards $J^2$ become taut. As the pilot then rises further the lanyards $J^2$ will withdraw the quick-release devices $J^1$ of the thigh-retaining straps so as to release these straps also, when the pilot will be completely freed from the safety harness without however disturbing the parachute harness. Further, if the pilot wishes to lean forward without releasing himself he can exert a pull on the loops $H^2$ to slacken and thereby lengthen the strap H, when he can lean forward and after he has resumed his normal position can again tighten the strap H by pulling on the free ends thereof.

In the alternative arrangements illustrated in Figures 5 and 6 the general arrangement of the safety harness is similar to that shown in Figures 1 and 2 except that instead of parachute harness a body harness equivalent in general structure to part of the parachute harness, shown in Patent 339,388 of Great Britain is employed, and instead of quick-release devices for the shoulder straps and thigh-anchoring straps the body harness carries a single quick-release device for permitting the release of the pilot from the harness. Thus, in the construction shown in Figures 5 and 6 the ends of the shoulder straps G are connected by fastenings $G^1$, $G^2$, J similar to the quick-release devices shown in Figure 1 except that no releasing tabs $J^1$ are provided, to chest straps K the lower ends of which are connected together and to the ends of a thigh strap $K^1$ by a single central quick-release device $K^2$ formed as shown in Figure 6 and comprising a pin $K^3$ on to which are threaded the lower ends of the chest straps K and the ends of the thigh strap $K^1$, these ends normally being retained on the pin by a safety cotter $K^4$ passing through a hole in the end of the pin $K^3$ and provided with spring members $K^5$ for normally retaining it in position.

In this construction, when the pilot wishes to release himself from the safety harness, he withdraws the safety cotter $K^4$, whereupon the chest straps K and the ends of the thigh strap $K^1$ are simultaneously released and the pilot is free to rise from his seat.

In the arrangement shown in Figures 7 and 8 the safety harness is shown as used separate from parachute harness and employing a strap element comprising a thigh strap L and two chest straps $L^1$ extending upwardly therefrom, the thigh strap and the chest straps being permanently connected together at $L^2$. Each of the chest straps $L^1$ is connected through a quick-release device of the kind shown in Figures 3 and 4 to a shoulder strap M, and these shoulder straps pass over the pilot's shoulders and are provided at their rear ends with metal loops $M^1$. Passing through these loops and through an upper rear anchor $F^3$ is a strap N which, after passing through each loop $M^1$, passes down the pilot's back and through a common lower rear anchor $F^1$ secured to the floor of the aircraft and thence through one of two side anchors F to an adjusting buckle $D^1$ whereby it is coupled to a thigh-anchoring strap D connected by a quick-release device similar to the device C, $C^1$, J shown in Figures 1 and 2 to one end of the thigh strap L, this quick-release device being releasable automatically by a lanyard $J^2$ when the pilot rises after releasing the shoulder straps M in the same manner as the corresponding quick-release devices in the construction shown in Figures 1 and 2.

The harness as shown in Figures 7 and 8 may be employed in conjunction with parachute harness provided with attachments as shown in Figures 1 and 2, and the adjusting buckle $D^1$ permits of adjustment of the length of the strap N to allow for small variations in the positioning or length of the attachments on different parachute harness and also for differences in the build of different individuals who may use the harness.

Further, the harness shown in Figures 7 and 8 may be employed with a chest and thigh strap element as shown in Figures 5 and 6, in which case the releasing tabs $J^1$ can be dispensed with.

Again, the safety harness shown in Figures 1 and 2 may be employed with a strap device as shown in Figures 7 and 8 whether a parachute is also being employed or not.

It will be seen that safety harness according to the present invention can be employed either with or without parachute harness without alteration of the safety harness, so that the safety harness can be installed upon aircraft and a pilot can then attach the safety harness either to a strapping element of the kind shown in Figures 5 and 6 or Figures 7 and 8 if he is not proposing to employ a parachute, or to suitable tabs on his parachute harness if he is using a parachute, while only a single member has to be operated to effect the quick release of the pilot from the safety harness. Further, in the forms shown in Figures 1, 2 and 5 the safety harness, while normally retaining the pilot firmly in his seat, enables him to effect a ready adjustment to permit him to lean forward if desired and then, when he has regained his normal position, to readjust the harness so that he again will be maintained firmly in place.

It is to be understood that safety harness according to this invention is not limited to use with a strap element engaging the pilot's thighs and extending upwards over his chest, but in some cases may be employed in conjunction with fastening devices suitably attached to or mounted upon the wearer's clothing.

It will be appreciated that the anchorages F and F¹ and F³ can be suitably secured to any part of the seat or the aircraft and alternatively that the straps E, instead of passing through a slot in the back of the seat and thence under the seat, may extend directly from the shoulders outside the seat and be passed through either one or two independent anchorages at the back of the seat, secured in suitable positions and thence passed through additional roller or similar attachments to enable the straps to be free of any cables or controls, and finally secured to the thigh strap D.

What I claim as my invention and desire to secure by Letters Patent is:—

1. Safety harness for aeronauts including in combination shoulder straps and thigh-anchoring straps, anchoring means for the shoulder straps from which the straps pass over the wearer's shoulders, quick-release devices for connecting the ends of the shoulder straps to each side of the wearer's chest, anchoring devices for the thigh-anchoring straps, fastenings whereby the ends of the thigh-anchoring straps can be detachably connected to the wearer's thighs, and means for automatically releasing the fastenings for the ends of the thigh-anchoring straps when the wearer rises after releasing the quick-release devices for the ends of the shoulder straps.

2. Safety harness for aeronauts including in combination shoulder straps and thigh-anchoring straps, side anchors, a rear anchor disposed behind the wearer's shoulders, means for connecting one end of each thigh-anchoring strap to the adjacent side anchor, fastenings whereby the other ends of the thigh-anchoring straps can be connected to the wearer's thighs, fastenings for detachably connecting the forward ends of the shoulder straps to the wearer's chest, a loop on each shoulder strap, and strapping extending from each side anchor through the loop on each shoulder strap and thence to the rear anchor.

3. Safety harness for aeronauts including in combination shoulder straps and thigh-anchoring straps, a quick-release device whereby the forward end of each shoulder strap can be connected to the wearer's chest, a detachable fastening device whereby one end of each thigh-anchoring strap can be connected to the wearer's thigh, a side anchor for the other end of each thigh-anchoring strap, a rear anchor situated behind the wearer's shoulders, a loop on each shoulder strap, strapping extending from each side anchor through the loop on the adjacent shoulder strap to the rear anchor, and means whereby the fastenings for the thigh-anchoring straps are automatically released when the wearer rises after releasing the fastenings for the shoulder straps.

4. Safety harness for aeronauts including in combination thigh straps adapted to pass over the wearer's thighs, chest straps adapted to extend upwards from the thigh straps, shoulder straps adapted to pass over the wearer's shoulders, means for detachably connecting the forward ends of the shoulder straps to the chest straps, thigh-anchoring straps, side anchors to which the thigh-anchoring straps are connected, means for detachably connecting the thigh-anchoring straps to the thigh straps, a rear anchor situated behind the wearer's shoulders, a loop on each shoulder strap, and strapping extending from each side anchor through the loop on the adjacent shoulder strap to the rear anchor.

5. Safety harness for aeronauts including in combination shoulder straps and thigh anchoring straps, a quick release device whereby the forward end of each shoulder strap can be connected to the wearer's chest, a detachable fastening device whereby one end of each thigh-anchoring strap can be connected to the wearer's thigh, a side anchor for the other end of each thigh-anchoring strap, a rear anchor situated behind the wearer's shoulders, a loop on each shoulder strap, strapping extending from each side anchor through the loop on the adjacent shoulder strap to the rear anchor, quick adjusting mechanism for this strap disposed adjacent to at least one of the side anchors, and means whereby the fastenings for the thigh-anchoring straps are automatically released when the wearer rises after releasing the fastenings for the shoulder straps.

6. Safety harness for aeronauts including in combination thigh straps adapted to pass over the wearer's thighs, chest straps adapted to extend upwards from the thigh straps, shoulder straps adapted to pass over the wearer's shoulders, means for detachably connecting the forward ends of the shoulder straps to the chest straps, thigh-anchoring straps, side anchors to which the thigh-anchoring straps are connected, means for detachably connecting the thigh-anchoring straps to the thigh straps, a rear anchor situated behind the wearer's shoulders, a loop on each shoulder strap, strapping extending from each side anchor through the loop on the adjacent shoulder strap to the rear anchor, and quick adjusting mechanism for this strapping disposed adjacent to at least one of the side anchors.

7. Safety harness for aeronauts including in combination side anchors and a rear anchor, thigh-anchoring straps each of which extends through its adjacent side anchor, through the rear anchor and thence upwards over the wearer's shoulders to constitute a shoulder strap, fastenings whereby the end of each shoulder strap can be detachably connected to the wearer's chest, and fastenings whereby the ends of the thigh-anchoring straps can be connected to the wearer's thighs.

8. Safety harness for aeronauts including in combination side anchors and upper and lower rear anchors, thigh-anchoring straps each of which extends through its adjacent side anchor through the lower rear anchor and thence upwards over the wearer's shoulders to constitute a shoulder strap, fastenings whereby the end of each shoulder strap can be detachably connected to the wearer's chest, fastenings whereby the ends of the thigh-anchoring straps can be connected to the wearer's thighs, a loop on each shoulder strap, strapping extending from each side anchor through the loop on the adjacent shoulder strap to the upper rear anchor, and quick-adjusting means for this strapping disposed adjacent to at least one of the side anchors.

9. Safety harness for aeronauts including in combination side anchors, a lower rear anchor and an upper rear anchor, shoulder straps extending over the wearer's shoulders, fastenings whereby the forward end of each shoulder strap can be detachably connected to the wearer's chest, a loop at the rear end of each shoulder strap, thigh-anchoring straps each of which extends through its adjacent side anchor, through the lower rear anchor and thence upwards through the loop on the adjacent shoulder strap to the upper rear anchor, and means for detachably connecting the thigh-anchoring straps to the wearer's thighs.

10. Safety harness for aeronauts including in combination thigh straps adapted to pass over the wearer's thighs, chest straps adapted to extend upwards from the thigh straps, shoulder straps adapted to pass over the wearer's shoulders, means for anchoring the shoulder straps at a point behind the wearer, quick-release devices for connecting the ends of the shoulder straps which extend over the wearer's shoulders to the chest straps, thigh-anchoring straps, means for anchoring the thigh-anchoring straps, fastenings for detachably connecting the thigh-anchoring straps to the thigh straps and means for automatically releasing these fastenings when the wearer rises after releasing the quick-release devices for the ends of the shoulder straps.

11. Safety harness for aeronauts including in combination shoulder straps and thigh-anchoring straps, side anchors, a rear anchor disposed behind the wearer's shoulders, quick-release devices for connecting the forward ends of the shoulder straps to the wearer's chest, a loop on the rear end of each shoulder strap, means for connecting one end of each thigh-anchoring strap to the adjacent side anchor, fastenings whereby the other ends of the thigh-anchoring straps can be connected to the wearer's thighs, means for automatically releasing these fastenings when the wearer rises after releasing the quick-release devices for the ends of the shoulder straps, and strapping extending from each side anchor through the loop on each shoulder strap and thence to the rear anchor.

12. Safety harness for aeronauts including in combination thigh straps adapted to pass over the wearer's thighs, chest straps adapted to extend upwards from the thigh straps, shoulder straps adapted to pass over the wearer's shoulders, quick-release devices for detachably connecting the forward ends of the shoulder straps to the chest straps, thigh-anchoring straps, side anchors to which the thigh-anchoring straps are connected, fastenings for detachably connecting the thigh-anchoring straps to the thigh straps, means for automatically releasing these fastenings when the wearer rises after releasing the quick-release devices for the shoulder straps, a rear anchor situated behind the wearer's shoulders, a loop on each shoulder strap, and strapping extending from each side anchor through the loop on the adjacent shoulder strap to the rear anchor.

13. Safety harness for aeronauts including in combination thigh straps adapted to pass over the wearer's thighs, chest straps adapted to extend upwards from the thigh straps, shoulder straps adapted to pass over the wearer's shoulders, quick-release devices for detachably connecting the forward ends of the shoulder straps to the chest straps, thigh-anchoring straps, side anchors to which one end of each thigh-anchoring strap is connected, detachable fastenings for connecting the thigh-anchoring straps to the thigh straps, means whereby these fastenings are automatically released when the wearer rises after releasing the quick-release devices for the shoulder straps, a rear anchor situated behind the wearer's shoulders, a loop on each shoulder strap, strapping extending from each side anchor through the loop on the adjacent shoulder strap to the rear anchor, and quick-adjusting mechanism for this strapping disposed adjacent to at least one of the side anchors.

14. Safety harness for aeronauts including in combination side anchors and a rear anchor, thigh-anchoring straps each of which extends through its adjacent side anchor through the rear anchor and thence upwards over the wearer's shoulders to constitute a shoulder strap, quick-release devices for connecting each shoulder strap to the wearer's chest detachable fastenings whereby the ends of the thigh-anchoring straps can be connected to the wearer's thighs, and means whereby these fastenings are automatically released when the wearer rises after releasing the quick release devices for the shoulder straps.

15. Safety harness for aeronauts including in combination side anchors and upper and lower rear anchors, thigh-anchoring straps each of which extends through its adjacent side anchor through the lower rear anchor and thence upwards over the wearer's shoulders to constitute a shoulder strap, quick-release devices whereby the end of each shoulder strap can be detachably connected to the wearer's chest, detachable fastenings whereby the ends of the thigh-anchoring straps can be connected to the wearer's thighs, means whereby these fastenings are automatically released when the wearer rises after releasing the quick-release devices for the shoulder straps, a loop on each shoulder strap, strapping extending from each side anchor through the loop on the adjacent shoulder strap to the upper rear anchor, and quick-adjusting means for this strapping disposed adjacent to at least one of the side anchors.

16. Safety harness for aeronauts including in combination side anchors, a lower rear anchor and an upper rear anchor, shoulder straps extending over the wearer's shoulders, quick-release devices whereby the forward ends of the shoulder straps can be detachably connected to the wearer's chest, a loop on the rear end of each shoulder strap, thigh-anchoring straps each of which extends through its adjacent side anchor, through the lower rear anchor and thence upwards through the loop on the adjacent shoulder strap to the upper rear anchor, fastening devices for detachably connecting the thigh-anchoring straps to the wearer's thighs, and means whereby these fastenings are automatically released when the wearer rises after releasing the quick-release devices for the shoulder straps.

17. Safety harness for aeronauts including in combination thigh straps extending over the wearer's thighs, chest straps extending upwards from these thigh straps, side anchors and upper and lower rear anchors, thigh-anchoring straps each of which extends through its adjacent side anchor through the lower rear anchor and thence upwards over the wearer's shoulders to constitute a shoulder strap, quick-release devices whereby the end of each shoulder strap can be connected to the upper end of a chest strap, fastenings whereby the ends of the thigh-anchoring straps can be detachably connected to the thigh straps, means whereby these fastenings are automatically released when the wearer rises after releasing the quick-release devices for the shoulder straps, a loop on each shoulder strap, strapping extending from each side anchor through the loop on the adjacent shoulder strap to the upper rear anchor, and quick-adjusting means for this strapping disposed adjacent to at least one of the side anchors.

18. Safety harness for aeronauts including in combination straps extending over the wearer's thighs, chest straps extending upwards from the thigh straps, side anchors, a lower rear anchor and an upper rear anchor, shoulder straps extending over the wearer's shoulders, quick-release devices whereby the forward ends of the shoulder straps can be connected to the upper ends of the chest straps, a loop on the rear end of each shoulder strap, thigh-anchoring straps each of which extends through its adjacent side anchor, through the lower rear anchor and thence upwards through the loop on the adjacent shoulder strap to the upper rear anchor, fastenings for detachably connecting the thigh-anchoring straps to the thigh straps, means whereby these fastenings are automatically released when the wearer rises after releasing the quick-release devices for the shoulder straps, and quick-adjusting means for the thigh-anchoring straps disposed adjacent to at least one of the side anchors.

19. Safety harness for aeronauts including in combination side anchors, shoulder straps, quick release devices for connecting each shoulder strap to the wearer's chest, thigh-anchoring straps passing through the side anchors, detachable fastenings whereby the ends of the thigh-anchoring straps can be connected to the wearer's body adjacent to the thighs, and strapping so interconnecting each thigh-anchoring strap with a shoulder strap that the release of the shoulder straps automatically slackens the thigh-anchoring straps so that these thigh-anchoring straps can then slide through their anchors and permit the wearer to rise.

20. Safety harness for aeronauts including in combination side anchors, shoulder straps, quick release devices for connecting each shoulder strap to the wearer's chest, thigh-anchoring straps each passing freely through a side anchor and then upwards, being connected at its upper end to shoulder strap, and detachable fastenings whereby the ends of the thigh-anchoring straps remote from those connected to the shoulder straps can be connected to the wearer's thighs.

21. Safety harness for aeronauts including in combination side anchors, shoulder straps, quick release devices for connecting each shoulder strap to the wearer's chest, thigh-anchoring straps passing through the side anchors, detachable fastenings whereby the ends of the thigh-anchoring straps can be connected to the wearer's body adjacent to the thighs, strapping so interconnecting each thigh-anchoring strap with a shoulder strap that the release of the shoulder straps automatically slackens the thigh-anchoring straps so that these thigh-anchoring straps can then slide through their anchors and permit the wearer to rise, and means whereby the rising of the wearer after releasing the shoulder straps automatically brings about the release of the said detachable fastenings to free the wearer.

22. Safety harness for aeronauts including in combination side anchors, shoulder straps, quick release devices for connecting each shoulder strap to the wearer's chest, thigh-anchoring straps each passing freely through a side anchor and then upwards, being connected at its upper end to a shoulder strap, detachable fastenings whereby the ends of the thigh-anchoring straps remote from those connected to the shoulder straps can be connected to the wearer's thighs, and means whereby the rising of the wearer after releasing the shoulder straps automatically brings about the release of the said detachable fastenings.

23. In safety harness for aviators the combination of a rear anchor, shoulder straps, quickly releasable means to connect the shoulder straps to the wearer, strap means to connect the shoulder straps to said anchor including quick adjusting means to loosen or tighten said strap means to permit the wearer to lean forward as desired, side anchor straps having means secured to the aircraft and quickly releasable fasteners to enable disconnection of the wearer therefrom, and means to adjust the effective lengths of the respective side anchor straps without release of said fasteners or disconnection of the same from the aircraft.

24. In safety harness for aviators and the like the combination of an aircraft attached anchor, means to connect the wearer with the anchor including a releasable fastening, and means to automatically release said fastening to free the wearer from the anchor upon arising of the wearer from a sitting posture.

25. In safety harness for aviators and the like the combination of an aircraft attached anchor, means to connect the wearer with the anchor including a releasable fastening, means to automatically release said fastening to free the wearer from the anchor upon arising of the wearer from a sitting posture, and other means for releasably anchoring the wearer in a sitting posture in the aircraft including a manually actuable quick release fastener.

26. In safety harness for aviators and the like, the combination of side anchors for attachment to an aircraft, means connected with the lower part of the body of the wearer and with the side anchors at each side of the wearer including releasable fasteners for holding the wearer in a sitting posture in the aircraft, and means for automatically releasing said fasteners to free the wearer from connection with the aircraft upon arising of the wearer from a sitting posture.

27. In safety harness for aviators and the like, the combination of side anchors for attachment to an aircraft, means connected with the lower part of the body of the wearer and with the side anchors at each side of the wearer including releasable fasteners for holding the wearer in a sitting posture in the aircraft, means for automatically releasing said fasteners to free the wearer from connection with the aircraft upon arising of the wearer from a sitting posture, a rear anchor secured to the aircraft, and strap means for connecting the upper part of the body of the wearer to said rear anchor to hold the wearer in a sitting posture including a manually actuable release fastening.

28. In aviators' safety harness the combination of a rear anchor, shoulder straps having connection with said anchor and each having quickly releasable fastening means connecting each of the shoulder straps to the wearer, side anchors, side straps freely slidable upon said side anchors and extending therefrom upwardly to the rear of the wearer and having connections with said shoulder straps, and quickly releasable fasteners for connecting said side straps to the sides of the body of the wearer.

In testimony whereof I have signed my name to this specification.

ALBERT ALEXANDER LETHERN.